United States Patent
Yi et al.

(10) Patent No.: US 9,554,024 B2
(45) Date of Patent: Jan. 24, 2017

(54) METHOD OF MANUFACTURING AN IMAGE SENSOR MODULE

(71) Applicant: Samsung Electronics Co., Ltd, Suson-si, Gyeonggi-do (KR)

(72) Inventors: Dong-Hun Yi, Asan-si (KR); Jong-Keun Jeon, Cheonan-si (KR); Yong-Jin Lee, Cheonan-si (KR); Kee-Seok Kim, Cheonan-si (KR)

(73) Assignee: SAMSUNG ELECTRONICS CO., LTD., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 483 days.

(21) Appl. No.: 14/090,302

(22) Filed: Nov. 26, 2013

(65) Prior Publication Data

US 2014/0083600 A1    Mar. 27, 2014

Related U.S. Application Data

(62) Division of application No. 12/894,432, filed on Sep. 30, 2010, now Pat. No. 8,619,185.

(30) Foreign Application Priority Data

Oct. 1, 2009  (KR) .......................... 10-2009-0093976

(51) Int. Cl.
   *H04N 5/225*    (2006.01)

(52) U.S. Cl.
   CPC .......... *H04N 5/2254* (2013.01); *H04N 5/2253* (2013.01); *H04N 5/2257* (2013.01)

(58) Field of Classification Search
   None
   See application file for complete search history.

(56) References Cited

U.S. PATENT DOCUMENTS

| 2006/0043544 A1 | 3/2006 | Tsukamoto et al. |
| 2008/0120946 A1* | 5/2008 | Bayne ................ B65D 81/05 53/396 |
| 2008/0296714 A1 | 12/2008 | Yuan et al. |

(Continued)

FOREIGN PATENT DOCUMENTS

| JP | 2002-118243 | 4/2002 |
| JP | 2005-184630 | 7/2005 |

(Continued)

*Primary Examiner* — Barbara J Musser
(74) *Attorney, Agent, or Firm* — Muir Patent Law, PLLC

(57) ABSTRACT

An image sensor module and an imaging device. An image sensor package includes a plurality of image sensor chips for generating image signals and a lower transparent board over the image sensor chips. An upper transparent board is positioned over the lower transparent board and includes a lens for focusing an external light to the image sensor chips. An adhesion member is interposed between the upper transparent board and the lower transparent board, and thus the upper and lower transparent boards are adhered to each other by the adhesion member such that the lens and the image sensor chips are aligned with each other. A dehumidifying agent is arranged in the adhesion member to absorb moistures from an interior of the image sensor module. Accordingly, the moistures are prevented from being condensed onto the surface of the image sensor module.

10 Claims, 9 Drawing Sheets

(56) References Cited

U.S. PATENT DOCUMENTS

2009/0122178 A1* 5/2009 Kwon ............... H01L 27/14618
  348/340
2011/0012219 A1* 1/2011 Lin .................... B81C 1/00285
  257/433

FOREIGN PATENT DOCUMENTS

| JP | 2008-053287 | 3/2008 |
| KR | 10-0719328 | 5/2007 |
| KR | 10-0867508 | 10/2008 |

* cited by examiner ized by vapor in the metal housing and causes damage to the image sensor module.
METHOD OF MANUFACTURING AN IMAGE SENSOR MODULE

CROSS-REFERENCE TO RELATED APPLICATIONS

This application is a Divisional application of prior U.S. application Ser. No. 12/894,432, filed on Sep. 30, 2010 in the United States Patent and Trademark Office, which claims the benefit under 35 USC §119 of Korean Patent Application No. 10-2009-0093976, filed on Oct. 1, 2009, in the Korean Intellectual Property Office, the disclosure of which is incorporated herein in its entirety by reference.

BACKGROUND

1. Field of the Invention

Exemplary embodiments relate to an image sensor module and an imaging device including the image sensor module, and a method of manufacturing the image sensor module and the imaging device, and more particularly, to an image sensor module including a wafer level chip size package, and a method of manufacturing the image sensor module, and an imaging device including the above image sensor module and a method of manufacturing the imaging device.

2. Description of the Related Art

As processing and packaging technologies for semiconductor devices have rapidly developed in recent times, solid state imaging devices, a kind of a photo-electronic device, usually require higher capacity with lower power consumption together with high degree of integration.

In the conventional solid state imaging device, a plurality of photodiodes may be arranged in 1-dimension or 2-dimensions. A plurality of photoelectrons are generated from the photodiodes responsive to external photo signals, and the photoelectrons are detected by an image sensor module. The image sensor module generates analogue image signals from the detected photoelectrons, and the analogue image signals are transformed to digital image signals in the solid state imaging device. Thus, the solid state imaging device may be classified as a charge-coupled device (CCD) type and a complementary metal oxide semiconductor (CMOS) type in accordance with the structure of the image sensor module.

Recently, CMOS image sensors (CIS) have been used in imaging devices more widely than the CCD image sensor, since the CIS has the significant advantages of lower power consumption and a higher degree of integration as the striking technological improvement of semiconductor devices. Thus, the CIS has been widely used in mobile devices such as a cellular phone, which particularly need low power consumption characteristics, and special equipments such as a surveillance camera and a biometric system, which particularly need high capacity and a high degree of integration.

A CIS chip is usually manufactured at a high degree of integration by utilizing process technologies for semiconductor devices, and is packaged into a CIS module by various packaging technologies. The CIS module may be applied to various electronic appliances with ease. However, recent electronic appliances, particularly mobile devices, require product characteristics of lightness, thinness, shortness and smallness, and thus the CIS module needs to be made smaller as much as possible. A chip size packaging (CSP) technology has been most widely used for making the CIS module as small as possible.

According to the conventional CSP technology, an image sensor chip, which is manufactured on a semiconductor substrate by a series of semiconductor manufacturing processes, is mounted on a transparent board such as a glass board in such a way that an electrode pad of the image sensor chip is electrically connected to metal wirings in the transparent board by an external terminals such as a solder ball. In addition, the image sensor chip and the transparent board are also mechanically bonded to each other by the solder ball, thereby forming a CIS package. Particularly, the bonding of the image sensor chip and the transparent board is performed at a wafer level to simplify the packaging process and efficiently downsize the CIS package. A wafer, on which a plurality of the image sensor chips are manufactured, and the transparent board are bonded to each other as a whole, and the assembly of the wafer and the transparent board is then cut into pieces by an image sensor chip. That is, the image sensor packages are obtained by cutting the assembly of the wafer and the transparent board into pieces, not by bonding an individual image sensor chip to the mounting substrate.

A camera lens is combined with the individual image sensor chip to thereby form a wafer level image sensor module. Then, the image sensor module is installed to an inside of a metal housing for protecting the image sensor module from surroundings, thereby manufacturing a miniature solid state imaging device.

The camera lens is adhered onto the transparent board of the image sensor package by an adhesion material or substance. Consequently, the metal housing protects the image sensor module only from external shocks, and thus the image sensor module may still be damaged by vapor in environmental air.

The vapor in the environmental air can freely flow through the metal housing and cause damage to the image sensor module in the metal housing. In addition, the vapor in the adhesion material is also vaporized in the metal housing and causes damage to the image sensor module.

Particularly, when the imaging device is operated for a long time, or under humid atmospheric conditions, the vapor in the environmental air is condensed on a surface of the camera lens in the metal housing. The condensation of the vapor on the camera lens seriously deteriorates the image quality of the imaging device.

Accordingly, there is still a need for an improved wafer level image sensor module or an imaging device including the improved image sensor module in which the vapor in an environmental air and the adhesion can be efficiently removed.

SUMMARY

Example embodiments provide a wafer level image sensor module having dehumidification function and a method of manufacturing the same.

Other exemplary embodiments provide an imaging device including the above wafer level image sensor module and a method of manufacturing the same.

Additional aspects and utilities of the present general inventive concept will be set forth in part in the description which follows and, in part, will be obvious from the description, or may be learned by practice of the present general inventive concept.

According to some exemplary embodiments, there is provided an image sensor module including an image sensor package including a plurality of image sensor chips and a lower transparent board, an upper transparent board over the lower transparent board, an adhesion member interposed between the upper transparent board and the lower transparent board and a dehumidifying agent arranged in the adhesion member for absorbing moistures from an inside of the image sensor module. The image sensor package may include a plurality of image sensor chips arranged on a substrate and a lower transparent board over the substrate, and thus the substrate and the lower transparent board may define a first transmitting space through which the image sensor chips are exposed. The upper transparent board may be positioned over the lower transparent board and may include a lens for focusing an external light to the image sensor chips, and thus the upper and lower transparent board may define a second transmitting space corresponding to the first transmitting space. The adhesion member may be interposed between the upper transparent board and the lower transparent board and the upper and lower transparent boards may be adhered to each other by the adhesion member.

In an example embodiment, the dehumidifying agent may include silicon resin. Particularly, the silicon resin may include a thermosetting resin having porous silica and dark pigments.

In an exemplary embodiment, the image sensor package may include a wafer level chip size package having at least an electrode pad connected to the image sensor chip, at least a penetration electrode penetrating the substrate and making contact with the electrode pad and at least an external electrode electrically connected to the penetration electrode. Particularly, the image sensor chip includes one of a charge-coupled device (CCD) and a complementary metal-oxide semiconductor (CMOS) device.

In an exemplary embodiment, the image sensor package includes a flip chip package in which the external electrode is positioned on a rear surface of the substrate opposite to the image sensor chips that are positioned on a front surface of the substrate.

According to other exemplary embodiments, there is provided an imaging device from which the moistures may be efficiently removed. The imaging device may include an image sensor module having a dehumidifying agent, a housing for holding the image sensor module and a supplementary dehumidifying agent. The image sensor module may include a lens for focusing an external light, a plurality of image sensor chips for generating image signals in response to the external light and a dehumidifying agent for absorbing moistures from an inside of the image sensor module. The housing may have a lens opening through which the lens is exposed and a housing space for holding the image sensor module. The supplementary dehumidifying agent may be positioned on an inner sidewall of the housing and may absorb the moistures in the housing space of the housing.

In an exemplary embodiment, the housing may be shaped into a open hollow box in such a configuration that a lens opening through which the lens of the image sensor module may be exposed to surroundings, and a gate through which the image sensor module may move into/out of the housing space, are arranged to the housing in a body.

In an exemplary embodiment, the supplementary dehumidifying agent is coated on an inner sidewall of the housing.

In an exemplary embodiment, the housing includes one of thermoplastic resin, metal and compositions thereof.

According to other exemplary embodiments, there is provided a method of manufacturing an image sensor module. An image sensor package may be prepared. The image sensor module may include a plurality of image sensor chips on a substrate and a lower transparent board over the substrate, so that a first transmitting space may be defined between the substrate and the lower transparent board and the image sensor chips may be arranged in the first transmitting space. An upper transparent board may be prepared in such a configuration that an adhesion member including a dehumidifying agent therein and a lens for focusing an external light to the image sensor chips may be arranged on a surface of the upper transparent substrate. The adhesion member of the upper transparent board may be bonded to the lower transparent board of the image sensor package in such a manner that the lens is arranged correspondently to the image sensor chips.

In an exemplary embodiment, the upper transparent board may be prepared through the following steps. The adhesion member may be formed on a peripheral region of the upper transparent board and then a cavity may be formed in the adhesion member. The cavity may be filled up with moisture absorbents and a thermal hardening treatment may be formed to the moisture absorbents, to thereby form the dehumidifying agent in the adhesion member. Thus, a surface of the dehumidifying agent may be exposed through an entrance of the cavity. The lens may be arranged on a central region of the upper transparent board. The central region of the upper transparent board may be defined by the adhesion member that may be formed on the peripheral region.

In an exemplary embodiment, the cavity may be formed by a blowing process and the moisture absorbent may include a gel type resin mixture in which gel type silica and dark pigments are mixed with each other.

In an exemplary embodiment, the step of forming the cavity and the step of the filling the cavity with moisture absorbents may be simultaneously performed in a single process together with each other.

In an exemplary embodiment, an adhesive film may be further formed between the adhesion member and the lower transparent board such that the dehumidifying agent may be spaced apart from the lower transparent board by a distance.

In an exemplary embodiment, the image sensor package may be prepared by a wafer level chip scale package process.

According to other exemplary embodiments, there is provided a method of manufacturing an image device. An image sensor module may be prepared. The image sensor module may include a lens for focusing an external light, a plurality of image sensor chips for generating image signals in response to the external light and a dehumidifying agent for absorbing moistures from an inside of the image sensor module. A housing may be formed to have a lens opening through the lens is exposed, and having a housing space for holding the image sensor module. A supplementary dehumidifying agent may be formed on an inner sidewall of the housing. The supplementary dehumidifying agent may absorb moistures in the housing space. The image sensor module may be installed into the housing space.

In an exemplary embodiment, the supplementary dehumidifying agent may be formed as follows. Silicon resins and filling powders that can include silica gel and dark pigments may be mixed up to thereby form a gel type resin. A mixture of the gel type resin and hardening agents may be injected onto the inner sidewall of the housing, to thereby form a preliminary dehumidifying layer on the inner sidewall of the housing. A thermal hardening treatment may be formed to the preliminary dehumidifying layer, to thereby form the supplementary dehumidifying layer on the inner sidewall of the housing.

In an exemplary embodiment, the mixture of the gel type resin and the hardening agents may be injected by a dispenser that is inserted into the housing space through the lens opening and in which the mixture of the gel type resin and the hardening agents are stored.

In an exemplary embodiment, the supplementary dehumidifying agent may include a zeolite layer coated on the inner sidewall of the housing by a deposition process.

According to some exemplary embodiments of the present inventive concept, the dehumidifying agent may be arranged in the image sensor module for generating image signals by photoelectric transformation, thereby preventing moistures from being condensed onto the surface of the focusing lens in the image sensor module. In addition, the supplemental dehumidifying agent may be further arranged on the inner sidewall of the housing, thereby removing the moistures from air flowing through the housing. Therefore, the moistures and the vapors in the imaging device may be prevented from being condensed onto the image sensor module, thereby increasing reliability of the imaging device.

According to an exemplary embodiment of the present inventive concept, an image sensor module is provided comprising a substrate that includes a first surface formed with a sensor chip and a second surface formed with an external electrode to transmit a signal from the sensor chip to an external device, a supporting member formed with a lens assembly disposed over the sensor chip, and a humidity control unit formed into the supporting member to control at least one of humidity and vapor in a space within the lens assembly. According to a further exemplary embodiment of the present inventive concept, the supporting member comprises a plurality of transparent boards, and one or more adhesions disposed between adjacent transparent boards to provide space to accommodate a lens of the lens assembly. In addition, the humidity control unit is disposed in at least one of the one or more adhesions, and has a portion exposed to the space.

BRIEF DESCRIPTION OF THE DRAWINGS

Exemplary embodiments will be more clearly understood from the following detailed description taken in conjunction with the accompanying drawings.

The above and/or other aspects of the present general inventive concept will become apparent and more readily appreciated from the following description of the exemplary embodiments, taken in conjunction with the accompanying drawings, in which.

DETAILED DESCRIPTION OF THE EMBODIMENTS

Figure 1:
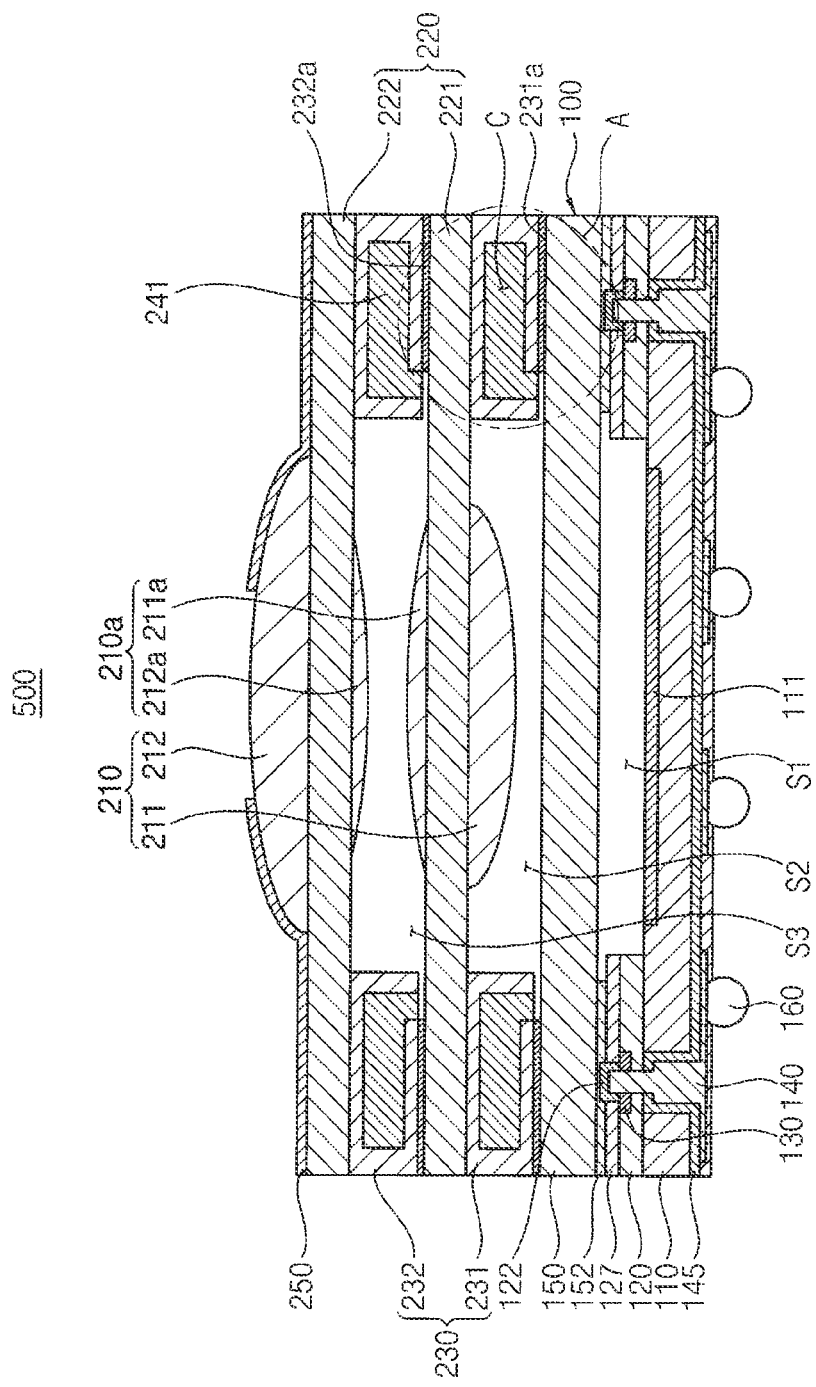
FIG. 1 is a plan view illustrating an image sensor module in accordance with an exemplary embodiment of the present inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Various exemplary embodiments will be described more fully hereinafter with reference to the accompanying drawings, in which several exemplary embodiments are shown. The present invention may, however, be embodied in many different forms and should not be construed as limited to the example embodiments set forth herein. Rather, these exemplary embodiments are provided so that this disclosure will be thorough and complete, and will fully convey the scope of the present invention to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, exemplary embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments will be explained in detail with reference to the accompanying drawings.

FIG. 1 is a plan view illustrating an image sensor module in accordance with an exemplary embodiment of the present inventive concept.

Referring to FIG. 1, an image sensor module 500 in accordance with an exemplary embodiment of the present inventive concept may include an image sensor package 100 for generating image signals in response to external lights, at least one transparent board that includes at least one lens for focusing the external light to the image sensor package 100, an adhesion substance or material for adhering the transparent board and the image sensor package to each other, and a dehumidifier substance or material arranged in the adhesion for removing vapor and moisture from internal environments thereof.

In an exemplary embodiment, the image sensor package 100 may include a substrate 110 onto which a plurality of image sensor chips 111 for generating the image signals by photoelectric transformation are placed or located, an insulation interlayer 120 covering a plurality of conductive structures (not shown) on the substrate 110, at least one electrode pad 130 arranged on the insulation interlayer 120 and electrically connected to the image sensor chips 111, at least one penetration electrode 140 for electrically connecting the electrode pad 130, and an external wiring line and a lower transparent board 150 positioned over the image sensor chip 111 to thereby define a first transmitting space S1.

In an exemplary embodiment, the substrate 110 may include a semiconductor wafer such as a silicon wafer, a silicon germanium wafer and a germanium wafer. The image sensor chips may be arranged on a front surface of the substrate 110 and a rear surface of the substrate 110 may be polished until the substrate 110 may have a thickness of about 50 μm. The image sensor chip 111 may include a semiconductor device having a photodiode (not shown) and an image sensor (not shown). The photodiode may generate photoelectrons in response to the external light and the image sensor may detect the photoelectrons and generate image signals in accordance with the detected photoelectrons. For example, the image sensor chip 111 may include a charge-coupled device (CCD) and a complementary metal oxide semiconductor (CMOS) device.

The insulation interlayer 120 may be arranged on a front surface of the substrate 110 in such a configuration that the image sensor chip 111 may be exposed and the conductive structures on the substrate may be electrically insulated from one another. The conductive structure may include at least an interconnection and a metal wiring for electrically connecting the image sensor chip 111 and the electrode pad 130 penetrating through the insulation interlayer. The conductive structure is formed in the substrate 110 to be connected to the electrical terminals of the sensor chip 111 and also formed in the insulation interlayer to be connected to electrode pad 130, such that signals can be transmitted from the sensor chip 111 to the electrode pad 130.

The electrode pad 130 may be arranged on the insulation interlayer 120 and may be electrically connected to the image sensor chip 111. For example, the electrode pad 130 may be positioned on a surface of the insulation interlayer 120 or a recess of the insulation interlayer 120 and may comprise a metal or a metal silicide. In the present exemplary embodiment, the electrode pad 130 may include a copper damascene structure positioned in the recess of the insulation interlayer 120.

The penetration electrode 140 may penetrate through the substrate 110 and the insulation interlayer 120 and make contact with the electrode pad 130. For example, the penetration electrode 140 may include a barrier layer on an inner surface of a via-hole and a conductive layer filling up the via-hole. Further, a separation layer 145 may be interposed between the substrate 110 and the penetration electrode 140 and may comprise a nitride or an oxide, and thus the substrate 110 may be electrically insulated from the penetration electrode 140.

The penetration electrode 140 may be connected to an external electrode 160 that may be arranged on the rear surface of the substrate 110 and the external electrode 160 may be connected to various electronic or electrical appliances such that signals can be transmitted between the image sensor 111 and the external electrode 160 or the various electrical appliances connected to the external electrode 160. For example, the penetration electrode 140 may include a solder ball and a solder bump. Therefore, the external electrode 160 may be opposite to the image sensor chip 111 and the substrate 110 like a flip chip structure. For example, the wafer onto which a plurality of the image sensor chips may be arranged may be bonded to the lower transparent board 150 as a whole, and the assembly (not shown) of the wafer and the board 150 may be cut into pieces by an image sensor chip, thereby forming a wafer level chip scale package. That is, substrate 110 includes opposite surfaces formed with the sensor chip 111 and the external electrode 160, respectfully.

A lower adhesive film 152 may be interposed between the insulation interlayer 120 and the lower transparent board 150 and thus the lower transparent board 150 may be adhered to the insulation interlayer 120. The lower transparent board 150 may include a glass board having high light transmittance and may face the substrate 110, so that the image sensor chip 111 may be covered with the lower transparent board 150. The substrate 110 onto which the image sensor chip 111 is positioned, the insulation interlayer 120, and the lower transparent board 150 may define a closed inner space into which the image sensor chip 111 may be exposed. The external light may pass through the inner space and be incident onto the image sensor chip 111. The closed inner space will be denoted as the first transmitting space S1.

The lower adhesive film 152 may include a thin adhesive tape comprising a thermosetting resin such as an epoxy resin and a polyimide resin, thereby reducing the height of the image sensor package 100. For example, a protection layer 127 may be further arranged on the insulation interlayer 120 and thus the conductive structures on the substrate 110 may be sufficiently protected from external environments such as a vapor in environmental air.

At least one upper transparent board 220 may be arranged on the image sensor package 100, and the upper transparent board 220 may include at least a lens for focusing the external light to the image sensor chip 111. The upper transparent board 220 and the lower transparent board 150 may be adhered to each other by an adhesion. A dehumidifying agent 241 may be arranged in the adhesion and thus the vapor and moisture in the environmental air may be sufficiently removed from the image sensor module 500. While the present exemplary embodiment discloses a pair of the upper and lower transparent boards so as to install a pair of concave and convex lenses in the image sensor module 500, other modifications may be allowable regarding combinations of the transparent boards in accordance with operation conditions and device requirements of the image sensor module, as would be known to one of the ordinary skill in the art.

A lens assembly 210 may be arranged over the image sensor package 100 and the external light may be efficiently focused to the image sensor chip 111. For example, the lens assembly may include a first lens 211 adjacent or closer to the image sensor package 100, and a second lens 212 exposed to external surroundings. In the present exemplary embodiment, the first and second lenses 211 and 212 may include a pair of the concave and convex lenses and thus the external light may be sufficiently well concentrated to the image sensor package 100.

The first lens 211 may be arranged on a rear (or lower) surface of a first upper transparent board 221 and the second lens 212 may be arranged on a front (or upper) surface of a second upper transparent board 222. The upper transparent board 220 may include a glass board like the lower transparent board 150 of the image sensor package 100.

The lens assembly 210 may be positioned over the image sensor chip 111 of the image sensor package 100, and thus the external light may be focused to the image sensor chip 111 by the lens assembly 210. Thus, the image sensor chip 111 may generate and detect a plurality of photoelectrons in response to the light and generate various image signals in accordance with the detected photoelectrons.

The first upper transparent board 221 may be adhered to the lower transparent board 150 of the image sensor package 100 by a first adhesion 231 and the second upper transparent board 222 may be adhered to a surface of the first upper transparent board 221 by a second adhesion 232. For example, the adhesion 230, which includes first and second adhesions 231 and 232, may comprise thermosetting resin and ultraviolet curable resin. In the present exemplary embodiment, the adhesion 230 may include a mixture of epoxy resins, polymerization initiators, organic peroxides and filling agents. The filling agent may reduce the difference of linear expansion coefficients of the transparent board and the adhesion.

An upper adhesive film 231a may be interposed between the adhesion 230 and the upper transparent board 220 and thus a dehumidification path may be provided between the transparent board 220 and the adhesion 230. The dehumidification path may have height corresponding to the thickness of the upper adhesive film 231a. The upper adhesive film 231a and the dehumidification path will be described in detail hereinafter.

Therefore, the lower and upper transparent boards 150, 220 and the adhesion 230 may define another transmitting space through which the external light is transmitted to the image sensor chip 111. Particularly, the lower transparent board 150, the first upper transparent board 221 and the first adhesion 231 may define a second transmitting space S2 and the first and second upper transparent boards 221 and 222 and the second adhesion 232 may define a third transmitting space S3.

The first transmitting space S1 adjacent or close to the image sensor package 100 and the second and third spaces S2 and S3 neighboring the lens assembly 210 may be stacked over the image sensor package 100, and thus the image sensor chip 111, the first lens 211, and the second lens 212 may be sequentially stacked along a vertical direction over the substrate 110.

A supplementary lens assembly 210a may be further provided in the third transmitting space S3. For example, the supplementary lens assembly 210a may include a first supplementary lens 211a over the first lens 211 and a second supplementary lens 212a under the second lens 212. The first and second supplementary lenses 211a and 212a may include a pair of convex and concave lenses, thereby increasing focusing efficiency of the external light transmitted to the image sensor chip 111 through the lens assembly 210.

The lenses and the supplementary lenses may have spherical or non-spherical shapes, and the number and configuration of the lenses and the supplementary lenses may be varied in accordance with operation conditions of the image sensor module 500.

A diaphragm 250 may be formed on the second upper transparent board 222 and on a portion of a surface of the second lens 212, and thus some portions of the second lens 212 may be covered with the diaphragm 250 and the other portions of the second lens 212 may be exposed through the diaphragm 250. Thus, the diaphragm 250 may determine the exposed portions of the lens 212 and may control the amount of the external light that may pass through the lens 212. Therefore, the diaphragm 250 may comprise a light-shielding material that may shield the transmittance of the external light through the lens 212. In the present exemplary embodiment, the diaphragm 250 may comprise a photoresist layer.

In an exemplary embodiment, the dehumidifying agent 241 may be arranged in the adhesion 230 and may dehumidify vapors and moisture from an inside of the image sensor module 500. For example, the dehumidifying agent 241 may be positioned in a cavity C that may be arranged inside of the adhesion 230.

Figure 2:
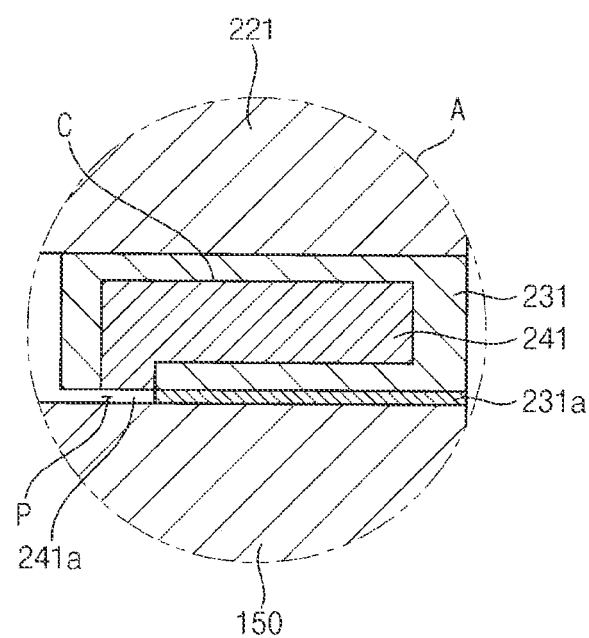
FIG. 2 is an enlarged view of a portion A in FIG. 1 in accordance with an exemplary embodiment of the present inventive concept.

FIG. 2 is an enlarged view of a portion A in FIG. 1 in accordance with an example embodiment of the present inventive concept.

Referring to FIG. 2, the dehumidifying agent 241 may have a large surface and a great amount of the vapors and the moistures may be absorbed into the dehumidifying agent 241 in the second and third transmitting spaces S2 and S3. Thus, the vapors and the moistures may be prevented from being condensed on the lens assembly 210 in the second and third transmitting spaces S2 and S3.

For example, the dehumidifying agent 241 may include a moisture absorbent for absorbing the moistures and vapors in air that may flow in the image sensor module 500. For example, the moisture absorbent may include a silicon compound. Silicon resins, filling powders including silica gel and dark pigments may be mixed up in a vessel to form a gel type resin. The gel type resin may then be injected into the adhesion 230 through an injection hole and a surface of the adhesion 230 may be planarized in such a manner that the surface of the adhesion 230 may be coplanar with the injected gel type resin. Thereafter, a heat treatment may be performed to the adhesion 230 that includes the gel type resin, to form a thermosetting resin as the moisture absorbent. While the present exemplary embodiment discloses the silicon resin as the dehumidifying agent, many other materials or agents known to one of the ordinary skill in the art may be used as the dehumidifying agent in place of, or in conjunction with, the silicon resin, on the condition that a sufficient amount of surface area is provided and injection into the adhesion is sufficiently easy. For example, aluminum oxide and zeolite and compositions thereof may also be used as the dehumidifying agent 241.

The first adhesion 231 may be adhered to the lower transparent board 150 in a medium of a first upper adhesive film 231a. Particularly, the first upper adhesive film 231a may be interposed between the first adhesion 231 and the lower transparent board 150, and should not be interposed between the dehumidifying agent 241 and the lower transparent board 150. As a result, a dehumidification path P may be provided between the dehumidifying agent 241 and the lower transparent board 150. The vapors and moistures in air may be absorbed into the dehumidifying agent 241 through the dehumidification path P in the first transmitting space S1.

The volume and shape of the dehumidifying agent 241 may be determined in accordance with the shape of the image sensor module 500, the size of the transmitting spaces S1 to S3, and operation conditions or requirements of the image sensor module 500. In addition, the size and shape of the dehumidification path P may be varied in accordance with the volume of the second transmitting space S2, and the operation conditions or requirements of the image sensor module 500. Dehumidifying agent 241 further includes an exposed portion 241a, adjacent to space p and other portions surrounded by first adhesion 231. Exposed portion 241a is exposed to spaces S2 and S3.

Accordingly, the vapors and moistures in the first and second transmitting spaces S1 and S2 may be absorbed into the dehumidifying agent 241 arranged in the first and second adhesions 231 and 232. Thus, the vapors and moistures may be prevented from being condensed on surfaces of the first and second lenses 211 and 212, thereby increasing operational reliability of the image sensor module 500. Dehumidifying agent 241 can control vapor or moisture level of spaces S2 and S3.

Hereinafter, a method of manufacturing the image sensor module shown in FIG. 1 will be described in detail with reference to FIGS. 3A to 3E.

FIGS. 3A to 3E are cross-sectional views illustrating process steps for a method of manufacturing the image sensor module shown in FIG. 1 in accordance with an example embodiment of the present inventive concept.

Figure 3A:
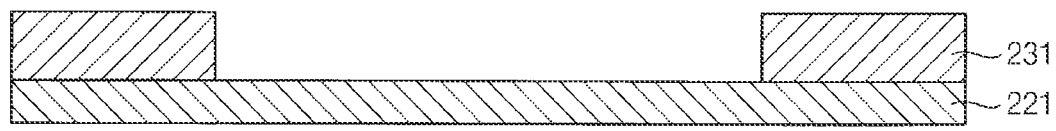
FIGS. 3A to 3E are cross-sectional views illustrating process steps for a method of manufacturing the image sensor module shown in FIG. 1 in accordance with an exemplary embodiment of the present inventive concept.

Referring to FIG. 3A, the first adhesion 231 may be coated on a peripheral surface of the first upper transparent board 221. The first upper transparent board 221 may include a glass board and a plastic board having good light transmittance. The first adhesion 231 may be coated along the peripheral region of the first upper transparent board 221 and thus no first adhesion may be provide on the central region of the upper transparent board 221 that may define the first transmitting space S1 of the image sensor package 100.

For example, thermosetting resins or ultraviolet curable resins may be coated on the peripheral surface of the first upper transparent board 221 in a shape of solid line or a dotted line by a molding process, including, for example, injection molding and extrusion molding. In the present exemplary embodiment, the ultraviolet curable resin may be used as the first adhesion 231 in view of its relatively short process time at a lower temperatures.

Figure 3B:
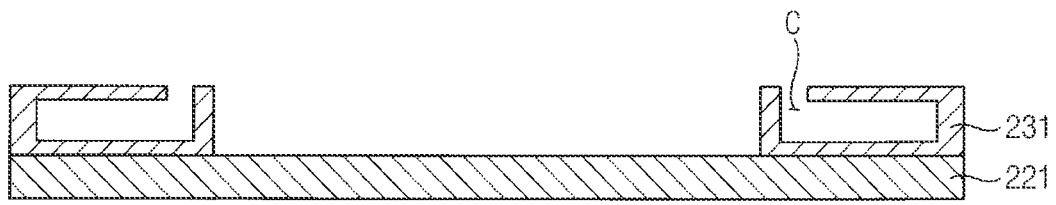

Referring to FIG. 3B, a blowing process may be performed on the first adhesion 231, to thereby form a cavity C in the first adhesion 231.

When first adhesion 231 has hardened and can maintain an overall shape in spite of external disturbances, a flexible member (not shown) may be squeezed into the first adhesion 231 by an extrusion molding process. Then, an expansion gas such as air may be pumped into the flexible member and thus the flexible member may be expanded in the first adhesion 231. Thereafter, the first adhesion 231 may be hardened completely and the flexible member may be removed from the first adhesion 231, thereby forming the cavity C in the first adhesion 231.

Figure 3C:
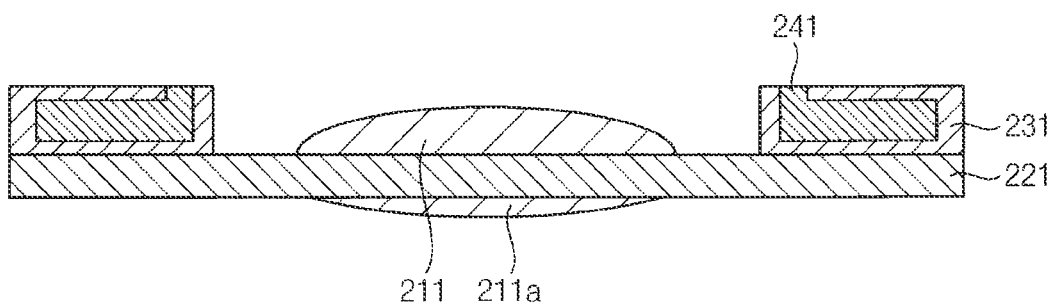

Referring to FIG. 3C, the moisture absorbents may be injected into the cavity C in sufficient amount to fill up cavity C, thereby forming dehumidifying agent 241 in cavity C.

For example, silicon resins and filling powders that include silica gel and dark pigments may be mixed up in a vessel to form a gel-type resin. Then, the gel-type resin may be injected into the first adhesion 231. Thereafter, a thermal hardening treatment may be performed to the first adhesion 231 that includes the gel-type resin, thereby forming the dehumidifying agent 241 in the first adhesion 231. Further, the gel-type resin in the vicinity of the injection hole of the cavity C may be planarized in such a manner that the surface of the first adhesion 231 may be coplanar with the injected gel-type resin.

Thereafter, the first lens 211 may be mounted on the central region of the first transparent board 221. In addition, the supplementary lens 211a may be further mounted on a rear (or lower) surface of the first transparent board 221 opposite to the first lens 211.

Figure 3D:
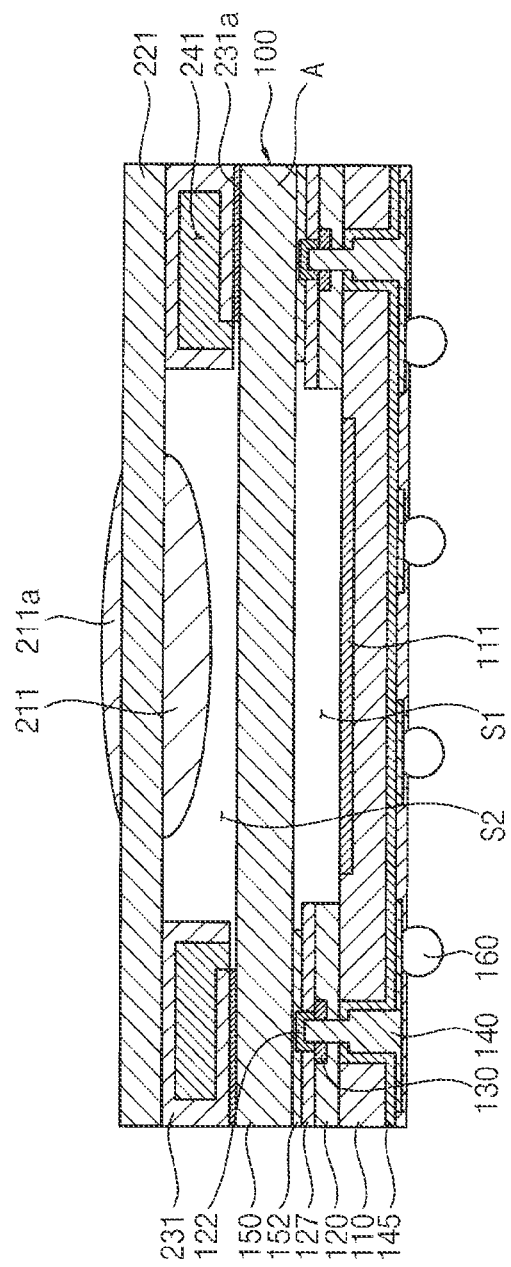

Referring to FIG. 3D, the first upper transparent board 221 may be bonded to the image sensor package 100 that may be already manufactured by a packaging process in such a manner that the first lens 211 may be arranged correspondently to the image sensor chips 111 of the image sensor package 100. For example, the first lens 211 and the image sensor chips 111 may be aligned with each other and the first upper transparent board 221 and the lower transparent board 150 of the image sensor package 100 may be bonded to each other by the first adhesion 231. Note that in FIG. 3C, the first upper transparent board 221 assembly is shown with first lens 211 pointing upwards, but in FIG. 3D, first upper transparent board 221 has been inverted, such that first lens 211 now faces downward.

In an exemplary embodiment, the image sensor package 100 may be manufactured by a chip scale packaging process. The wafer (not shown) onto which a plurality of the image sensor chips 111 may be arranged, may be bonded to the lower transparent board 150 as a whole, and the assembly (not shown) of the wafer and the board 150 may then be cut into pieces by an image sensor chip, thereby forming the image sensor package 100 as a wafer level chip scale package.

The first upper adhesive film 231a may be prepared on a peripheral surface of the lower transparent board 150 of the image sensor package 100, and the first adhesion 231 may be bonded to the first upper adhesive film 231a, thereby adhering the first upper transparent board 221 and the lower transparent board 150 to each other.

For example, the upper adhesive film 231a may be prepared in a size smaller than that of the first adhesion 231, and the entrance of the cavity C may not be covered with the upper adhesive film 231a. Therefore, the dehumidifying agent 241 in the cavity C may be exposed through the entrance of the cavity C and may be spaced apart from the surface of the lower transparent board 150, thereby forming the dehumidification path P between the first adhesion 231 and the lower transparent board 150. Since the exposed surface of the dehumidifying agent 241 may be coplanar with the surface of the first adhesion 231, the dehumidification path P may be uniform between the first adhesion 231 and the lower transparent board 150 in the second transmitting space S2.

Accordingly, the exposed surface of the dehumidifying agent 241 may be connected to the second transmitting space S2 through the dehumidification path P, and the moistures and the vapors in air may be absorbed into the dehumidifying agent 241 through the dehumidification path P, thereby preventing the moistures and the vapors from being condensed onto the first lens 211 in the second transmitting space S2.

Figure 3E:
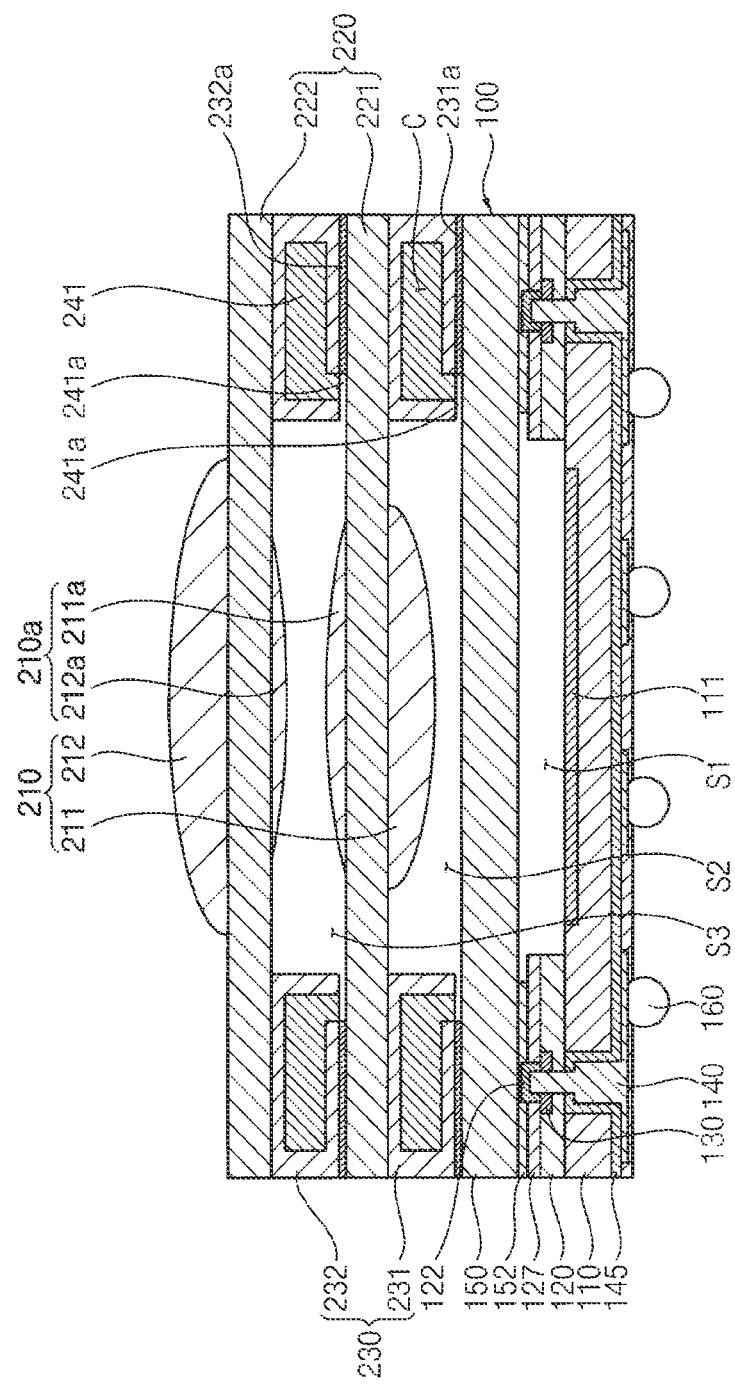

Referring to FIG. 3E, the second adhesion 232 that includes the dehumidifying agent 241 and the second lens 212 may be formed on the second upper transparent board 222 by the same processes as described with reference to FIGS. 3A to 3C. Then, the second upper transparent board 222 may be bonded to the first upper transparent board 221 by the second adhesive film 232a, thereby forming the image sensor module 500 shown in FIG. 1.

In the present exemplary embodiment, while the first lens 211 may be arranged on a rear surface of the first upper transparent board 221 onto which the first adhesion 231 may be arranged, the second lens 212 may be arranged on a front surface of the second upper transparent board 222 opposite to the second adhesion 232. Thus, the first lens 211 and the second lens 212 may be formed into a pair of convex and concave lenses in the image sensor module 500.

After forming the second lens 212 on the second upper transparent board 222, the diaphragm 250 may be formed on the second upper transparent board 222 and a portion of the surface of the second lens 212. For example, a photoresist layer may be formed on whole surfaces of the second upper transparent board 222 and the second lens 212. Then, the photoresist layer may be partially etched off from the surface of the second lens 212 using an etching mask, thereby forming a photoresist pattern through which the second lens 212 may be partially exposed. The photoresist pattern partially exposing the surface of the second lens 212 may be used as the diaphragm 250.

The second upper adhesive film 232a may be interposed between the first upper transparent board 221 and the second adhesion 232 in the same structure as the first upper adhesive film 231a, and thus the dehumidification path P may also be provided between the first upper transparent board 221 and the second adhesion 232. Therefore, moistures and vapors in the air may be absorbed into the dehumidifying agent 241 in the second adhesion 232 through the dehumidification path P, thereby preventing the moistures and vapors from being condensed onto the second lens 212 in the third transmitting space S3.

While the present exemplary embodiment discloses that the cavity formation and the injection of the moisture absorbent are performed in different processes, the cavity formation and the injection of the moisture absorbent may also be performed in the same process simultaneously together with each other. For example, the blowing process for forming the cavity C in the adhesion 230 may be performed by using the moisture absorbent in place of air, and thus the cavity formation may be performed simultaneously with injection of the moisture absorbent in a single process.

According to the present exemplary embodiment, the dehumidifying agent 241 may be further provided in the adhesion 230 and the moistures and vapors may be efficiently removed from the transmitting space of the image sensor module 500.

Figure 4:
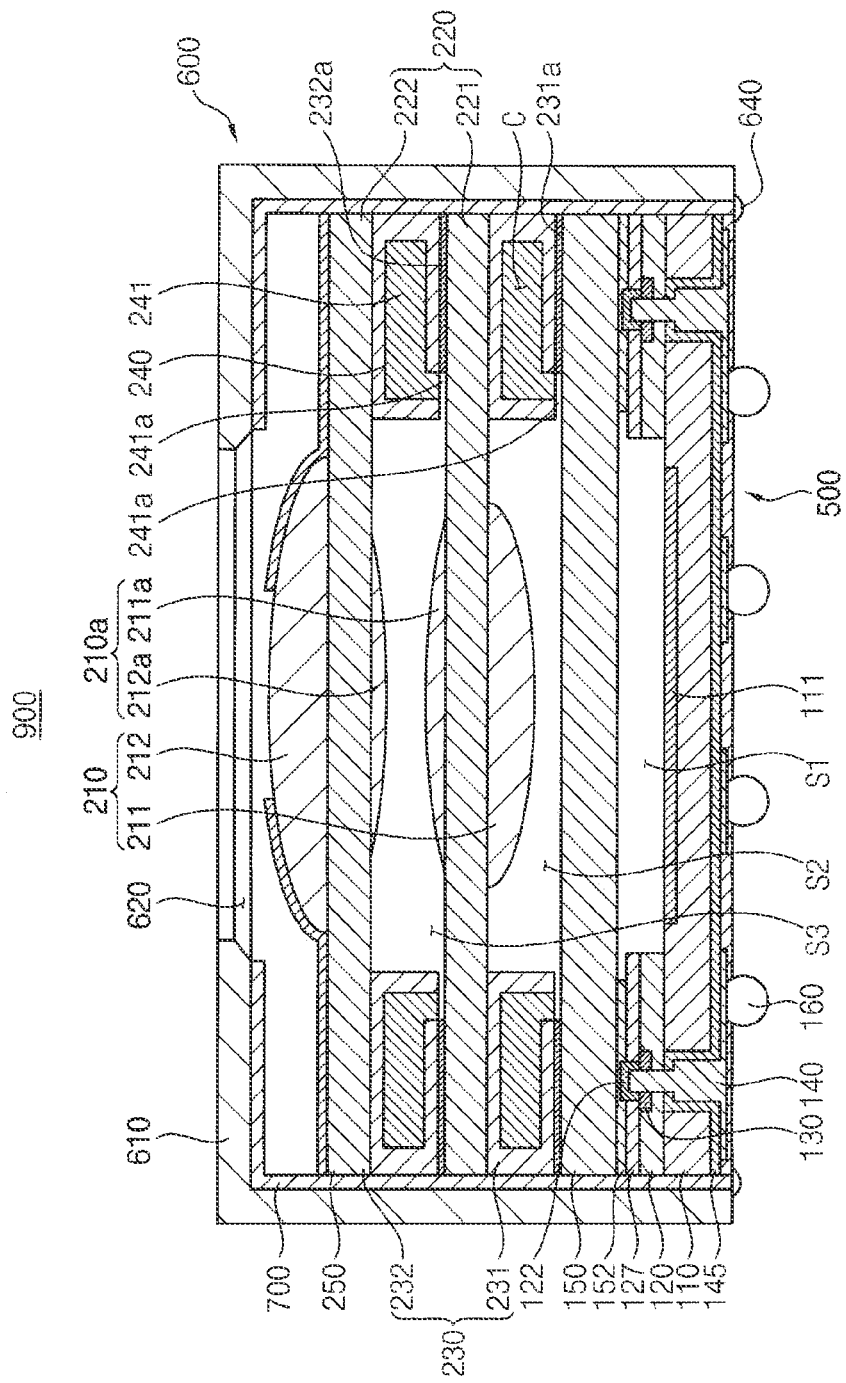
FIG. 4 is a cross-sectional view illustrating an imaging device including the image sensor module shown in FIG. 1 in accordance with an exemplary embodiment of the present inventive concept.
Figure 5:
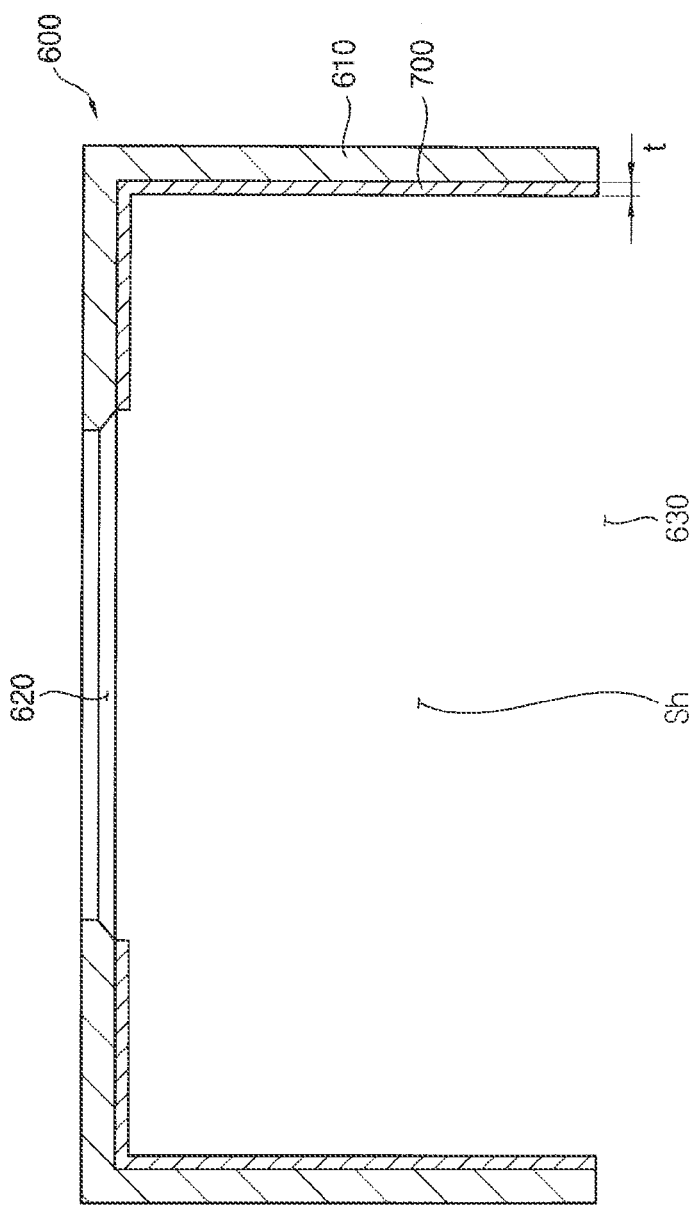
FIG. 5 is a cross-sectional view illustrating a housing of the imaging device shown in FIG. 4.

FIG. 4 is a cross-sectional view illustrating an imaging device including the image sensor module shown in FIG. 1 in accordance with an exemplary embodiment of the present inventive concept. FIG. 5 is a cross-sectional view illustrating a housing of the imaging device shown in FIG. 4.

Referring to FIGS. 4 and 5, an imaging device 900 in accordance with an exemplary embodiment of the present inventive concept may include at least a focusing lens, an image sensor module that includes an image sensor chip for generating image signals by photoelectric transformation and a dehumidifying agent for absorbing the moistures and vapors in the transmitting space, a housing 600 for protecting the image sensor module from environmental disturbances, and a supplemental dehumidifying agent 700 for absorbing the moistures and vapors in the housing 600.

The image sensor module 500 may have the same structures and configurations as described in detail with reference to FIGS. 1 and 2, and thus any further detailed descriptions on the image sensor module 500 will be omitted hereinafter. In FIG. 4, the same reference numerals denote the same elements in FIGS. 1 and 2.

The housing 600 may include a body 610 having a housing space Sh for holding the image sensor module 500, a lens opening 620 through which the lens is exposed to surroundings and a gate 630 for guiding the image sensor module 500 into the housing space Sh.

The body 610 may have a sufficient hardness and stiffness for absorbing external disturbances such as irregular impacts and shocks, and thus the image sensor module 500 in the housing space Sh may be sufficiently protected from external disturbances. For example, the body 610 may comprise aluminum or thermoplastic resin that may be characterized as a light weight and convenient for molding.

The lens opening 620 may be arranged at an upper portion of the body 610 and the second lens 212 of the image sensor module 500 may be exposed to surroundings. Thus, the external light may be incident onto the second lens 212 through the lens opening 620 and may pass sequentially through the third, second and first transmitting spaces S3, S2 and S1 to thereby reach the image sensor chip 111 of the image sensor package 100.

The gate 630 may be arranged at a lower portion of the body 610 and the image sensor module 500 may be installed into the housing space Sh through the gate 630. For example, the gate 630 may further include a guide (not shown) for aligning the second lens 212 and a center of the lens opening 620.

Therefore, the body 610 that includes the lens opening 620 and the gate 630 may be shaped as an open, shallow box. However, the body 610, the lens opening 620, and the gate 630 may be variously modified in accordance with the operational conditions and requirements of the imaging device 900. For example, the body 610 may include a plurality of body pieces and the lens opening 620 and the gate 630 may also be modified in accordance with the assembly of the body pieces.

In the present exemplary embodiment, the image sensor module 500 may be installed into the housing space Sh in such configuration that the second lens 212 may be arranged under the lens opening 620 and the external electrode 160 may be exposed to surroundings at the lower portion of the body 610. The gate 630 may be closed by the substrate 110 of the image sensor module 500 and thus the housing space Sh of the housing 600 may be isolated from the surroundings.

While the body 610 may be modified into various shapes in accordance with the purposes and applications of the imaging device 900, such shapes may take into account that the image sensor module 500 may be installed into the housing space Sh.

The supplemental dehumidifying agent 700 may be arranged on an inner sidewall of the body 610 and thus may absorb the moistures and vapors in air flowing in the housing space Sh. That is, the supplemental dehumidifying agent 700 may be arranged on the inner sidewall of the body 610 along a surface profile thereof and thus may be interposed between the image sensor module 500 and the body 610. Thus, the moistures and the vapors in the internal air may be sufficiently prevented from being condensed onto the image sensor module 500 in the housing space Sh.

For example, the supplemental dehumidifying agent 700 may include a supplemental dehumidifying pattern that may be shaped as a stripe on the inner sidewall of the body 610 with a thickness t. The thickness t of the supplemental dehumidifying agent 700 may be determined by free air flow and sufficient dehumidification in the housing space Sh of the body 610. That is, the supplemental dehumidifying agent 700 may have a sufficiently small thickness t that the supplemental dehumidifying agent 700 may be well spaced from the image sensor module 500 and thus the air may not be hindered from free flow in the housing space Sh. In addition, the supplemental dehumidifying agent 700 may have a sufficient thickness t for absorbing the moisture and vapors in the housing space Sh.

The supplemental dehumidifying agent 700 may include a moisture absorbent having good moisture absorption capability such as porous silica, and a porous oxide such as zeolite. The zeolite is a crystallized alumino silicate that includes aluminum oxide and silicon oxide.

When the image sensor module 500 may be installed into the housing space Sh of the body 610, the lower portion of the body 610 adjacent to the gate 630 may be bonded to the substrate 110 of the image sensor module 500 by a housing adhesive 640, and the upper portion of the body 610 adjacent to the lens opening 620 may be bonded to the upper surface of the second upper transparent board 222 by a housing adhesive film (not shown). Therefore, the image sensor module 500 may be stably installed in the housing 600 including the supplemental dehumidifying agent 700.

Thereafter, the imaging device 900 may be installed to a frame of various electronic and electrical appliances by a securing member (not shown).

According to the present exemplary embodiment of the imaging device, the dehumidifying agent 241 may be arranged in the image sensor module 500 and the supplemental dehumidifying agent 700 may be arranged on the inner sidewall of the housing 600, and thus the moistures in the transmitting spaces and the housing space may be sufficiently removed by the dehumidifying agent 241 and the supplemental dehumidifying agent 700, respectively. Therefore, the moistures and the vapors in the imaging device 900 may be prevented from being condensed onto the image sensor module 500, to thereby increase reliability of the imaging device 900.

Figure 6:
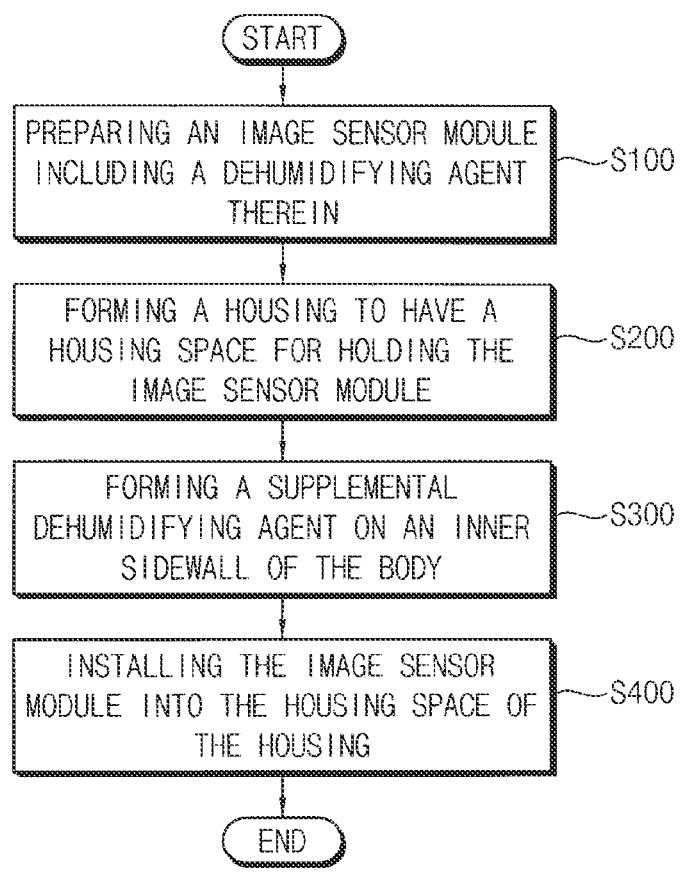
FIG. 6 is a flow chart showing processing steps for a method of manufacturing the imaging device shown in FIG. 4.

FIG. 6 is a flow chart showing processing steps for a method of manufacturing the imaging device shown in FIG. 4.

Referring to FIG. 6, the image sensor module 500 may be prepared (step S100) for manufacturing the imaging device 900 in accordance with an exemplary embodiment of the present inventive concept. The image sensor module 500 may include an image sensor chip for generating image signals by photoelectric transformation, and a dehumidifying agent for absorbing the moistures and vapors in the transmitting spaces. The image sensor module 500 may have the same structures and configurations as described in detail with reference to FIGS. 1 and 2, and may be manufactured in the same process as described with reference to FIGS. 3A to 3E. Thus, the same reference numerals denote the same elements in FIGS. 1 and 3A to 3E, and any further detailed descriptions on the image sensor module 500 will be omitted hereinafter.

In step S200, the housing 600 may then be formed in such a way that the housing space Sh may be prepared for holding the image sensor module 500.

For example, a molding process, such as an extrusion molding process and an injection molding process, may be used to create molding compacts that may be characterized as light-weight and conveniently shaped, and the body 610 and thus the body 610 may be molded into an open shallow box. In such case, the body 610 includes a housing space Sh, and the lens opening 620 through which the lens 212 may be exposed. The body 610 will further include the gate 630 through which the image sensor module 500 may be installed into the housing space Sh, both of which may be formed simultaneously together with one-another in the housing 600.

In particular, a blow process such as an extrusion blow process and an injection blow process may facilitate the formation of the housing space Sh of the body 610. In such a case, the internal volume of the housing space Sh may be determined by a size of the parison or the preform of the blow process that may be injected into the molding compact and by an amount of air that may be pumped into the parison or the perform of the blow process.

While the present exemplary embodiment includes a molding process for simultaneously forming the body 610, the lens opening 620 and the gate 630 together with one another, the body 610, the lens opening 620 and the gate 630 may be individually formed by respective processes. In such a case, the body 610, the lens opening 620 and the gate 630 may be assembled into the housing 600. In addition, the body 610 may include a plurality of body pieces and the lens opening 620 and the gate 630 may also be modified in accordance with the assembly of the body pieces.

Following formation of the body 610, the supplemental dehumidifying agent 700 may be formed on the inner sidewall of the body 610 (step S300).

For example, a dispenser may be inserted into the housing space Sh through the lens opening 620 and the gate 630 and the moisture absorbents for absorbing the moistures in the housing space Sh may be injected or dropped onto the inner sidewall of the body 610. For example, silicon resins, and filling powders that include silica gel and dark pigments may be mixed up in a vessel to form a gel-type resin. Then, a mixture of the gel-type resins and hardening agents may be filled up into the dispenser. The dispenser may be inserted into the housing space Sh and the mixture of the gel-type resin and the hardening agents may be injected onto the inner sidewall of the body 610, thereby form a preliminary dehumidifying layer on the inner sidewall of the body 610. Thereafter, a thermal hardening treatment may be performed on the preliminary dehumidifying layer for between about 1 hour to about 1.5 hours at a temperature of between about 120° C. to about 150° C., thereby forming the supplemental dehumidifying agent 700 on the inner sidewall of the body 610.

In such a case, injection time and injection amount of the moisture absorbents may determine the thickness t of the supplemental dehumidifying agent 700 on the inner sidewall of the body 610 in view of the volume of the housing space Sh, and the gap distance between the image sensor module 500 and the inner sidewall of the body 610.

In a modified exemplary embodiment, a zeolite layer may be directly coated on the inner sidewall of the body 610 by a deposition process. For example, aluminum oxide and silicon oxide may be directly deposited onto the inner sidewall of the body 610, thereby forming the zeolite layer on the inner sidewall of the body 610.

Then, the image sensor module 500 may be installed into the housing space Sh of the body 610, thereby completing manufacture of the imaging device 900 (step S400).

In an exemplary embodiment, the image sensor module 500 may be inserted into the housing space Sh of the body 610. and the lower portion of the body 610 adjacent to the gate 630 may be bonded to the substrate 110 of the image sensor module 500 by a housing adhesive 640 such as an epoxy resin. Furthermore, a housing adhesive film such as polyimide may be formed on the upper portion of the body 610 adjacent to the lens opening 620 and then the image sensor module 500 may be inserted into the housing space Sh such that image sensor module 500 may be bonded to the body 610 at the upper portion around the lens opening 620. Therefore, the image sensor module 500 may be stably installed in the housing 600 that includes the supplemental dehumidifying agent 700.

According to the present exemplary embodiment of the method of manufacturing the imaging device, the dehumidifying agent 241 may be arranged in the image sensor module 500 and the supplemental dehumidifying agent 700 may be arranged on the inner sidewall of the housing 600, and thus the moistures in the transmitting spaces and the housing space may be sufficiently removed by the dehumidifying agent 241 and the supplemental dehumidifying agent 700, respectively. Therefore, the moistures and the vapors in the imaging device 900 may be prevented from being condensed onto the image sensor module 500, to thereby increase reliability of the imaging device 900.

Figure 7:
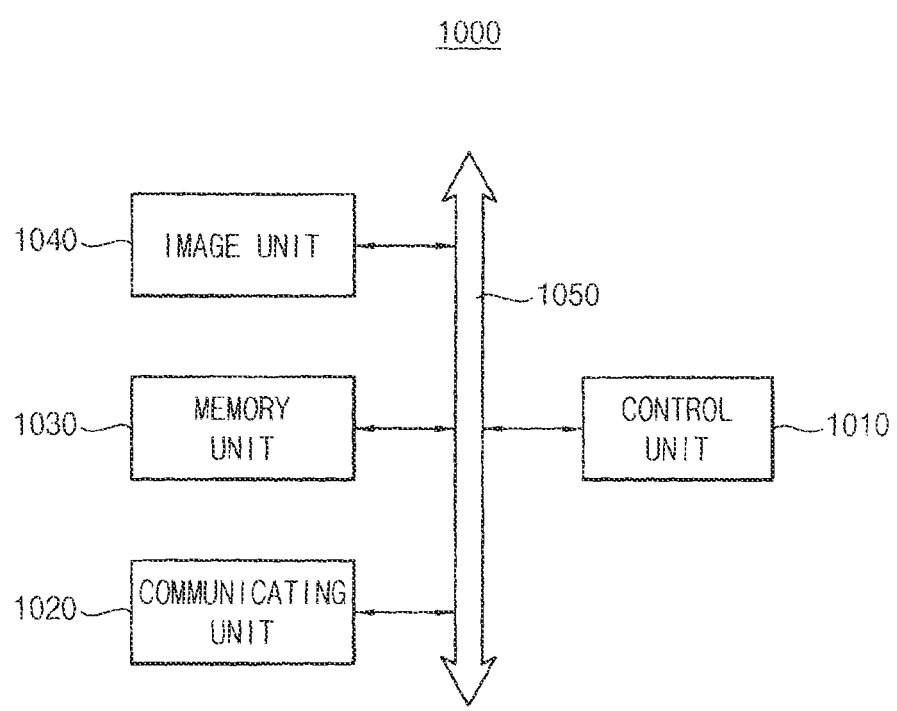
FIG. 7 is a block diagram showing an electronic appliance including the imaging device shown in FIG. 4 in accordance with an exemplary embodiment of the present inventive concept.

FIG. 7 is a block diagram showing an electronic appliance including the imaging device shown in FIG. 4 in accordance with an exemplary embodiment of the present inventive concept.

Referring to FIG. 7, an electronic appliance 1000 in accordance with an example embodiment of the present inventive concept may include a control unit 1010, a communicating unit 1020, a memory unit 1030 and an imaging unit 1040.

The control unit 1010 may include at least a processor for performing instructions. For example, the control unit 1010 may include a microprocessor, a digital signal processor and a microcontroller.

The communicating unit 1020 may include at least an access terminal for communicating data signals with the control unit 1010. For example, the communicating unit 1020 may include a keyboard, a keypad and various display devices.

Input data and output data, instruction signals for the control unit 1010 and the image signals generated from the imaging unit 1040 may be stored in the memory unit 1030.

The imaging unit 1040 may include the image sensor module 900 shown in FIG. 4 and may generate the image signals in response to the external light. Then, the image signals may be transferred to the memory unit 1030, the communicating unit 1020 and the control unit 1010 through a bus line 1050 and may be processed in accordance with an application of the electronic appliance 1000.

Particularly, the electronic appliance 1000 may include the image sensor module 500 having the dehumidifying agent and the housing 600 having the supplemental dehumidifying agent 700, so that the moistures and the vapors in the imaging device 900 may be efficiently and sufficiently removed by the moisture absorbents of the dehumidifying agent 241 and the supplemental dehumidifying agent 700. Thus, the moistures in the imaging device may be sufficiently prevented from being condensed onto the lens of the image sensor module 500 thereby increasing the image quality of the imaging device 900 and the reliability of the electronic appliance 1000.

While the present exemplary embodiment discloses the electronic appliance including the imaging device in which the image sensor chips may be arranged on the semiconductor substrate, any other semiconductor devices known to one of the ordinary skill in the art may be arranged on the substrate in place of the image sensor chips and thus the present inventive concept may be widely applied to various electronic appliances. For example, various memory chips such as a DRAM chip, a SRAM chip and a flash memory chip or various logic chips such as a control chip may be formed on the substrate in place of the image sensor chips, and thus the present inventive concept may be widely applied to various electronic appliances such as a personal digital assistant (PDA), a notebook computer, a wireless telephone, a mobile phone, an MP3 player, a memory card and a data sender/receiver.

According to the exemplary embodiments of the present inventive concept, the dehumidifying agent may be arranged in the image sensor module for generating image signals by photoelectric transformation to thereby prevent the moistures from being condensed onto the surface of the focusing lens in the image sensor module. In addition, the supplemental dehumidifying agent may be further arranged on the inner sidewall of the housing, to remove the moistures from air flowing through the housing. Therefore, the moistures and the vapors in the imaging device 900 may be prevented from being condensed onto the image sensor module 500, to thereby increase reliability of the imaging device 900.

The foregoing is illustrative of exemplary embodiments and is not to be construed as limiting thereof. Although a few exemplary embodiments have been described, those skilled in the art will readily appreciate that many modifications are possible in the example embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of various exemplary embodiments and is not to be construed as limited to the specific exemplary embodiments disclosed, and that modifications to the disclosed exemplary embodiments, as well as other exemplary embodiments, are intended to be included within the scope of the appended claims.

Although a few embodiments of the present invention have been shown and described, it would be appreciated by those skilled in the art that changes may be made in these embodiments without departing from the principles and spirit of the general inventive concept, the scope of which is defined in the claims and their equivalents.

What is claimed is:

1. A method of manufacturing an image sensor module, comprising:
    preparing an image sensor package that includes at least one image sensor chip on a substrate and a lower transparent board over the substrate;
    preparing an upper transparent board onto which a first adhesion member that includes a dehumidifying agent embedded therein, and a lens for focusing an external light to the at least one image sensor chip are arranged;
    bonding the first adhesion member of the upper transparent board to the lower transparent board of the image sensor package in such a manner that the lens is arranged correspondently to the at least one image sensor chip; and
    forming a first adhesive film between the first adhesion member and the lower transparent board such that the dehumidifying agent is spaced apart from the lower transparent board by a distance.

2. The method of claim 1, wherein preparing the upper transparent board includes:
    preparing a first upper transparent board and a second upper transparent board, wherein
    the first upper transparent board is adhered to the lower transparent board by the first adhesion member, which includes the dehumidifying agent embedded therein, and
    the second upper transparent board is adhered to an upper surface of the first upper transparent board by a second adhesion member, which includes the dehumidifying agent embedded therein.

3. The method of claim 2, further comprising: forming the first adhesive film between the first adhesion member and the lower transparent board such that the dehumidifying agent is spaced apart from the lower transparent board by a distance thereby defining a dehumidification path between the dehumidifying agent and the lower transparent board.

4. The method of claim 2, further comprising: forming a second adhesive film between the second adhesion member and the first upper transparent board such that the dehumidifying agent is spaced apart from the first upper transparent board by a distance thereby defining a dehumidification path between the dehumidifying agent and the first upper transparent board.

5. The method of claim 1, wherein preparing the upper transparent board includes:
    forming the first adhesion member on a peripheral region of the upper transparent board;
    forming a cavity in the first adhesion member; and
    filling the cavity with moisture absorbents.

6. The method of claim 5, wherein preparing the upper transparent board includes:
    performing a thermal hardening treatment to the moisture absorbents, to form the dehumidifying agent in the first adhesion member, a surface of the dehumidifying agent being exposed through an entrance of the cavity; and
    arranging the lens on a central region of the upper transparent board.

7. A method of manufacturing an image sensor module, comprising:
    preparing an image sensor package that includes at least one image sensor chip on a substrate and a lower transparent board over the substrate;
    preparing an upper transparent board onto which an adhesion member that includes a dehumidifying agent embedded therein, and a lens for focusing an external light to the at least one image sensor chip are arranged; and
    bonding the adhesion member of the upper transparent board to the lower transparent board of the image sensor package in such a manner that the lens is arranged correspondently to the at least one image sensor chip,
    wherein preparing the upper transparent board includes:
        forming a cavity in the adhesion member;
        filling the cavity with the dehumidifying agent;
        forming the adhesion member on a peripheral region of the upper transparent board;
        wherein filling the cavity with the dehumidifying agent includes filling the cavity with one or more moisture absorbents;
        performing a thermal hardening treatment to the one or more moisture absorbents, to form the dehumidifying agent in the adhesion member, a surface of the dehumidifying agent being exposed through an entrance of the cavity; and
        arranging the lens on a central region of the upper transparent board; and
    forming an adhesive film between the adhesion member and the lower transparent board such that the dehumidifying agent is spaced apart from the lower transparent board by a distance.

8. The method of claim 7, wherein forming the cavity is performed by a blowing process, and the dehumidifying agent includes a gel-type resin mixture in which gel-type silica and dark pigments are mixed with each other.

9. The method of claim 7, wherein forming the cavity and the filling the cavity with dehumidifying agent are simultaneously performed in a single process.

10. The method of claim 7, wherein the image sensor package is prepared by a wafer level chip scale package process which includes:
    bonding the wafer, onto which the at least one image sensor chip is arranged, to the lower transparent board; and cutting an assembly of the wafer and the lower transparent board into a plurality of pieces by the at least one image sensor chip.

* * * * *